(12) United States Patent
Jung (10) Patent No.: US 12,058,517 B2
(45) Date of Patent: Aug. 6, 2024

(54) VEHICLE SYSTEM, SERVER, AND VEHICLE COMMUNICATION SECURITY METHOD

(71) Applicants: HYUNDAI MOTOR COMPANY, Seoul (KR); Kia Corporation, Seoul (KR)

(72) Inventor: Ho Jin Jung, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 186 days.

(21) Appl. No.: 17/479,294

(22) Filed: Sep. 20, 2021

(65) Prior Publication Data

US 2022/0377539 A1   Nov. 24, 2022

(30) Foreign Application Priority Data

May 24, 2021   (KR) .................. 10-2021-0066448

(51) Int. Cl.
| | |
|---|---|
| *H04K 1/00* | (2006.01) |
| *H04W 4/46* | (2018.01) |
| *H04W 12/03* | (2021.01) |
| *H04W 12/04* | (2021.01) |

(52) U.S. Cl.
CPC ............ *H04W 12/04* (2013.01); *H04W 4/46* (2018.02); *H04W 12/03* (2021.01)

(58) Field of Classification Search
CPC ............................. H04W 12/04; H04W 12/03
USPC ........................................................... 380/270
See application file for complete search history.

(56) References Cited

U.S. PATENT DOCUMENTS

| | | | |
|---|---|---|---|
| 2013/0173112 A1* | 7/2013 | Takahashi | H04L 9/0894 713/168 |
| 2013/0257591 A1* | 10/2013 | Nishimura | G05B 11/01 340/5.2 |
| 2019/0028443 A1* | 1/2019 | Chin | G07C 9/00571 |
| 2019/0238555 A1* | 8/2019 | Buffard | H04L 67/12 |
| 2020/0322337 A1* | 10/2020 | Han | G06Q 10/02 |
| 2022/0103349 A1* | 3/2022 | Tsirkin | G06F 21/53 |

* cited by examiner

*Primary Examiner* — Jeffrey C Pwu
*Assistant Examiner* — Samuel Ambaye
(74) *Attorney, Agent, or Firm* — MORGAN, LEWIS & BOCKIUS LLP (57) ABSTRACT

A vehicle system, a server, and a vehicle communication security method are provided. The vehicle system includes a first controller that transmits vehicle identification information from other controllers in a vehicle and a second controller and a third controller among the other controllers that generates and stores a unique key of the vehicle using the vehicle identification information received from the first controller and a previously stored shared key. The second controller and the third controller perform communication based on the unique key.

15 Claims, 7 Drawing Sheets

VEHICLE SYSTEM, SERVER, AND VEHICLE COMMUNICATION SECURITY METHOD

CROSS-REFERENCE TO RELATED APPLICATION

The present application claims priority to Korean Patent Application No. 10-2021-0066448, filed on May 24, 2021, the entire contents of which is incorporated herein for all purposes by this reference.

BACKGROUND OF THE INVENTION

Field of the Invention

The present invention relates to a vehicle system, a server, and a vehicle communication security method, and more particularly, relates to technologies of performing vehicle communication security by generating a unique key independent for each vehicle.

Description of Related Art

With vehicle electrification and performance enhancement, vehicle manufacturers have continuously increased vehicle security requirements, while security threats increase and legal movement proceeds actively. The most important technology among them is the security key. By storing the security key in a secure storage, the security may be used for various security technologies.

All security functions are actually completed by an algorithm publicly known and a key which thoroughly ensures security. Thus, the core of vehicle security may be how to properly inject and manage keys used for each security function into the vehicle.

There are various key sets in the vehicle. There may be a function of operating in each separate controller, and there may be a key where several controllers share with each other for one function. For example, when the controller is booted and generates a boot MAC value by a specific key, there is no need to share the specific key and only the controller has the key. However, a key shared with a server infrastructure should be loaded into a controller for update, and when encryption communication is performed between several controllers, the same key should be shared between controllers.

However, when keys are the same as each other between vehicles and when the key is exposed by one vehicle, this has an influence on all vehicles. In other words, when a hacker obtains key data from one vehicle, the or she may make a replay attack in another vehicle using the key data and may make a brute force attack in a parallel in several vehicles using the key data to estimate a MAC or the key. Because the more the vehicles sharing the same key, the shorter the hacking time, it is vulnerable to security.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle system for generating a unique key in a vehicle, which differs for each vehicle, using a vehicle identification number to perform vehicle communication security, a server, and a vehicle communication security method.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains.

According to various aspects of the present invention, a vehicle system may include a first controller that transmits vehicle identification information to other controllers in a vehicle and a second controller and a third controller among the other controllers that generate and store a unique key of the vehicle using the vehicle identification information received from the first controller and a previously stored shared key. The second controller and the third controller may perform communication based on the unique key.

In various exemplary embodiments of the present invention, the first controller may transmit a unique key generation request message including the vehicle identification information to the second controller and the third controller, when ignition of the vehicle is initially turned on.

In various exemplary embodiments of the present invention, the second controller may encrypt communication data using the unique key and may transmit the encrypted communication data to the first controller or the third controller.

In various exemplary embodiments of the present invention, the second controller may decrypt encrypted communication data received from the first controller, using the unique key stored in the second controller.

In various exemplary embodiments of the present invention, the second controller or the third controller may be configured to generate the unique key shared in the vehicle by a key derivation function (KDF).

In various exemplary embodiments of the present invention, the first controller may include a gateway or an engine controller.

In various exemplary embodiments of the present invention, the first controller may transmit the vehicle identification information to the other controllers per a predetermined time period.

In various exemplary embodiments of the present invention, the same unique key may be stored in the second controller and the third controller.

In various exemplary embodiments of the present invention, the unique key may vary for each vehicle, although a type of each vehicle is a same as each other.

In various exemplary embodiments of the present invention, the first controller may include a communication device that communicates with the other controllers, a storage storing the shared key, and a processor that generates the unique key using the vehicle identification information and the shared key, when ignition of the vehicle is initially turned on.

In various exemplary embodiments of the present invention, the storage may include a hardware security module (HSM) or a trust execution environment (TEE).

According to various aspects of the present invention, a server may be configured for communicating with a vehicle system including a first controller configured to transmit vehicle identification information to other controllers in a vehicle and a second controller configured to generate and store a first unique key of the vehicle using the vehicle identification information received from the first controller and a previously stored shared key, requesting the first controller to transmit the vehicle identification information, and receiving the vehicle identification information from the first controller, generating and storing a second unique key using the previously stored shared key and the vehicle identification information, and communicating with the vehicle system using the second unique key.

In various exemplary embodiments of the present invention, the first unique key and the second unique key may be the same as each other.

In various exemplary embodiments of the present invention, the server may further include encrypting communication data using the second unique key and transmitting the encrypted communication data to the vehicle system and decrypting encrypted communication data received from the vehicle system using the second unique key.

According to various aspects of the present invention, a vehicle communication security method may include transmitting, by a first controller, vehicle identification information to a second controller and a third controller in a vehicle, generating and storing, by the second controller and the third controller, a unique key of the vehicle using the vehicle identification information received from the first controller and a previously stored shared key, and performing communication based on the unique key between the second controller and the third controller.

In various exemplary embodiments of the present invention, the transmitting may include transmitting, by the first controller, a unique key generation request message including the vehicle identification information to the second controller and the third controller, when ignition of the vehicle is initially turned on.

In various exemplary embodiments of the present invention, the transmitting may include transmitting, by the first controller, the vehicle identification information to the second controller and the third controller per a predetermined time period.

In various exemplary embodiments of the present invention, the generating and storing of the unique key may include generating the unique key shared in the vehicle by a key derivation function (KDF).

In various exemplary embodiments of the present invention, the vehicle communication security method may further include transmitting the vehicle identification information to a server, when receiving a request for the vehicle identification information from the server.

In various exemplary embodiments of the present invention, the vehicle communication security method may further include decrypting encrypted data based on the unique key, when receiving the encrypted data from the server.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains.

Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIGS. 1 to 7.

Figure 1:
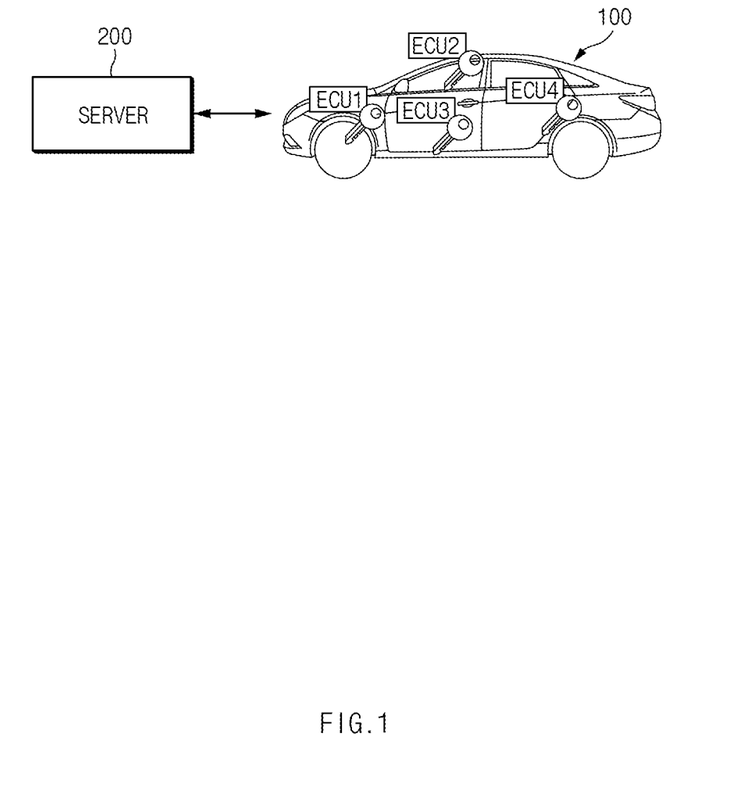
FIG. 1 is a drawing illustrating a configuration of a vehicle system according to various exemplary embodiments of the present invention.
Figure 2:
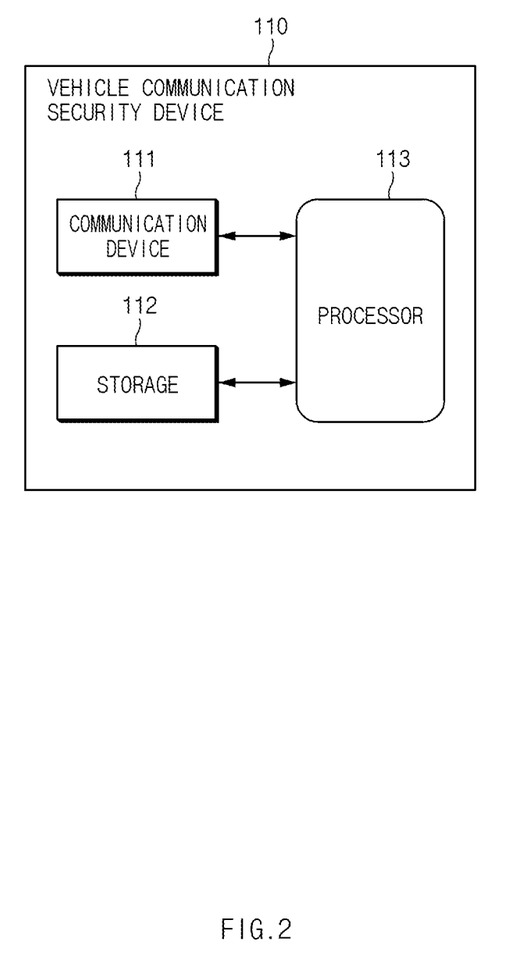
FIG. 2 is a block diagram illustrating a detailed configuration of a vehicle communication security device according to various exemplary embodiments of the present invention.

FIG. 1 is a drawing illustrating a configuration of a vehicle system according to various exemplary embodiments of the present invention. FIG. 2 is a block diagram illustrating a detailed configuration of a vehicle communication security device according to various exemplary embodiments of the present invention.

Referring to FIG. 1, a vehicle system 100 according to various exemplary embodiments of the present invention may communicate with an external server 200. The vehicle system 100 may include one or more controllers ECU1, ECU2, ECU 3, and ECU4 for controlling a vehicle.

The plurality of controllers ECU1, ECU2, ECU3, and ECU4 may include controllers which respectively implement a gateway, remote smart parking assist (RSPA), advanced driver assistance systems (ADAS), forward collision-avoidance assist (FCA), lane keeping assist (LKA), blind-spot collision-avoidance assist (BCA), smart cruise control (SCC), a surround view monitor (SVM), a head up display (HUD), a telematics terminal, audio video navigation (AVN), an engine control unit, and the like.

To the present end, the plurality of controllers ECU1, ECU2, ECU3, and ECU4 may be implemented in a form of a combination of hardware and software. Preferably, each of the plurality of controllers ECU1, ECU2, ECU3, and ECU4 may be implemented as a microprocessor and may be, for example, an electronic control unit (ECU), a micro controller unit (MCU), or another sub-controller, which is loaded into the vehicle. In various exemplary embodiments of the present invention, for convenience of description, the controller will be referred to as an ECU.

Each of the controllers ECU1, ECU2, ECU3, and ECU4 may be implemented in the vehicle, and may be implemented as a separate device configured for each function be connected to each other or may integrally implemented with control units in the vehicle. Each of the controllers ECU1, ECU2, ECU3, and ECU4 may store a shared key identical per vehicle type and a specialized unique key different for each vehicle, which are collectively injected at the beginning of vehicle manufacture. A specific controller (e.g., a gateway, an engine control unit, or the like) among the controllers ECU1, ECU2, ECU3, and ECU4 may store vehicle identification information. Furthermore, the controller ECU1 may be a controller configured for communicating with the server 200 or a specific infrastructure, which may be connected to a separate wired connection rather than a mounted modem or on-board diagnostics (OBD). As an example, the controller ECU 1 may include a navigation, a telematics terminal, or a controller which performs external plug and charge (PnC) charging. Furthermore, as a gateway and a server are connected to each other, when it is possible to perform direct communication, the controller ECU1 may become the gateway. In the instant case, the vehicle identification information may include, but is not limited to, a vehicle identification number (VIN), and may include various pieces of information configured for identifying a vehicle. However, in the description below, for convenience of description, a description will be provided using the vehicle identification information.

The controller ECU1 (or a first controller) may transmit the VIN to the other controllers ECU2, ECU3, and ECU4 in the vehicle. When ignition of the vehicle is initially turned on, the controller ECU1 may transmit the VIN to the other controllers ECU2, ECU3, and ECU4 in the vehicle. Furthermore, the controller ECU1 may transmit the VIN to the other controllers ECU2, ECU3, and ECU4 in the vehicle per predetermined time period after the ignition of the vehicle is initially turned on such that all the controllers ECU2, ECU3, and ECU4 may receive the VIN although wakeup times of the controllers ECU2, ECU3, and ECU4 are different from each other.

Each of the other controllers ECU2, ECU3, and ECU4 (or the second controller, the third controller, and the fourth controller) may generate and store a specialized unique key of the vehicle using the VIN received from the controller ECU1 and a shared key previously injected and stored when the vehicle is manufactured. In the instant case, each of the other controllers ECU2, ECU3, and ECU4 may generate a unique key specialized in only the vehicle by a key derivation function (KDF). Thus, because the unique keys respectively stored in the controllers ECU1, ECU2, ECU3, and ECU4 are generated using the same shared key and the same VIN, they have the same value. Because the VIN for each vehicle differs, the unique key for each vehicle differs. In the instant case, it is possible for each of the other controllers ECU2, ECU3, and ECU4 to generate the unique key using various common KDFs. For example, when there is PBKDF2 or the like as a type of KDF, when a key shared previously by a key value is used, and when the VIN is input using a salt value, all of controllers in the vehicle, having the VIN, may guide the same key.

Thus, each of the controllers ECU1, ECU2, ECU3, and ECU4 may perform encryption or decryption using the unique key to perform security communication. For example, when the controller ECU2 encrypts data to be transmitted using the unique key and transmits the encrypted data to the controller ECU3, the controller ECU3 may receive the encrypted data and may decrypt the received data using the unique key stored therein.

Thus, because a replay attack in another vehicle is impossible and because it is difficult to guess the key although several vehicles make a brute force attack in parallel, the reliability of security may be improved.

Furthermore, the vehicle system 100 may perform security communication with the external server 200. The server 200 may request the controller ECU1 of the vehicle system 100 to transmit a VIN to communication with the vehicle system 100. Thus, the controller ECU1 of the vehicle system 100 may transmit the VIN to the server 200. For convenience of description, the communication between the controller ECU1 and the server 200 is exemplified, but not limited thereto. Another controller ECU2, ECU3, or ECU4 and the server 200 may communicate with each other.

Thus, the server 200 may generate and store a unique key of the vehicle by the key derivation function (KDF) using the received VIN and the previously stored shared key. In the instant case, the unique key generated and stored in the server 200 may be the same as the unique key stored in each of the controllers ECU1, ECU2, ECU3, and ECU4. In the instant case, although not illustrated in FIG. 1, the server 200 may include components such as a processor for generating a unique key and a storage configured for storing a shared key, the unique key, or the like. The storage may include a hardware security module (HSM) or a trust execution environment (TEE) such that it is impossible to delete or change the stored unique key.

Thus, the server 200 may perform security communication with each of the controllers ECU1, ECU2, ECU3, and ECU4 of the vehicle system 100 using the generated unique key. For example, when the server 200 encrypts data using the unique key and transmits the encrypted data to the controller ECU1, the controller ECU1 may receive the encrypted data and may decrypt the received data using the unique key stored therein.

Each of the plurality of controllers ECU1, ECU2, ECU3, and ECU4 may be implemented as a vehicle communication security device 110 shown in FIG. 2.

Referring to FIG. 2, the vehicle communication security device 110 may include a communication device 111, a storage 112, and a processor 113.

The communication device 111 may be a hardware device implemented with various electronic circuits to transmit and receive a signal through a wireless or wired connection, which may transmit and receive information with devices in the vehicle based on a network communication technology in the vehicle. As an example, the network communication technology in the vehicle may include controller area network (CAN) communication, local interconnect network (LIN) communication, flex-ray communication, or the like.

Furthermore, the communication device 111 may communicate with a server, an infrastructure, another vehicle, or the like outside the vehicle through a wireless Internet technology or a short range communication technology. Herein, the wireless Internet technology may include wireless local area network (WLAN), wireless broadband (Wi-Bro), wireless-fidelity (Wi-Fi), Worldwide Interoperability for Microwave Access (WiMAX), or the like. Furthermore, the short range communication technology may include Bluetooth, ZigBee, ultra wideband (UWB), radio frequency identification (RFID), infrared data association (IrDA), or the like. As an example, the communication device 111 may transmit a VIN to the server 200 and may transmit or receive the encrypted data to/from the server 200.

Figure 3:
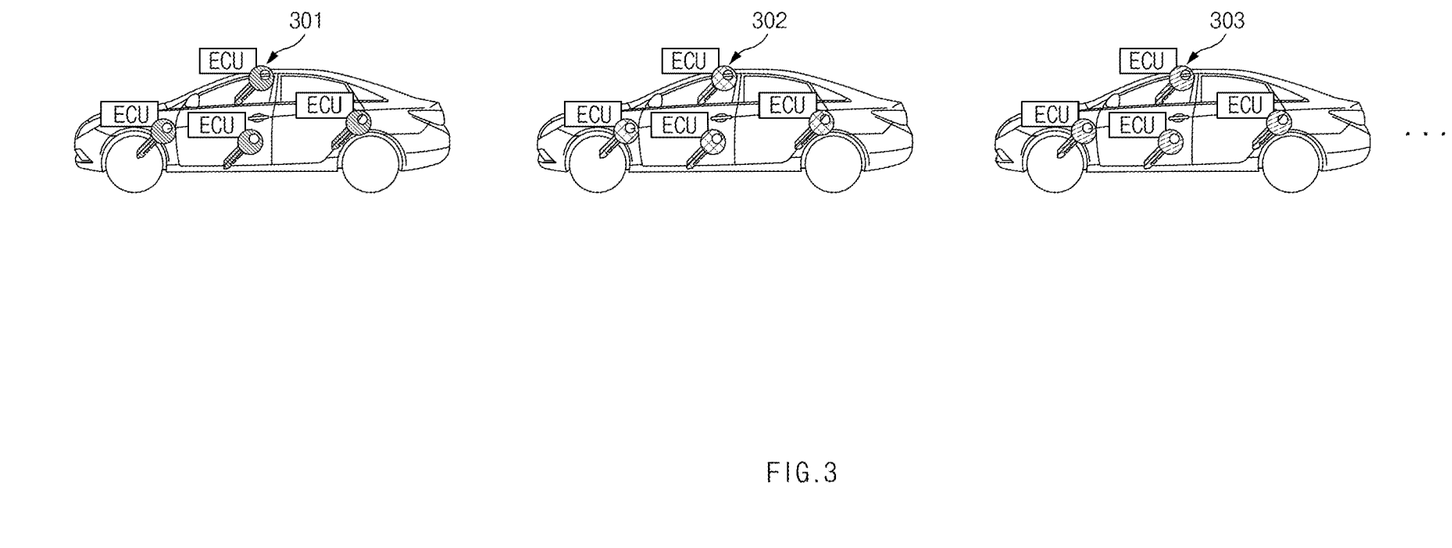
FIG. 3 is a drawing illustrating an exemplary screen of generating a unique key which differs for each vehicle according to various exemplary embodiments of the present invention.

The storage 112 may store data, an algorithm, and/or the like necessary for an operation of the processor 113. As an example, the storage 112 may store a shared key identical for each vehicle type, which is injected at the beginning of vehicle manufacture, and a unique key different for each vehicle, which is generated by each controller. When the controller is a gateway or an engine controller, the storage 112 may store a VIN. FIG. 3 is a drawing illustrating an exemplary screen of generating a unique key which differs for each vehicle according to various exemplary embodiments of the present invention. As shown in FIG. 3, a unique key 301, 302, or 303 differs for each vehicle. It is difficult to inject the same key or a different key into a specific controller in a controller manufacturer process line, but it is very difficult to inject a key set different for each vehicle into different controllers in common as shown in FIG. 3. This is because a controller manufacturer should receive keys which should be injected into different vehicles in advance from an OEM server, should inject the received keys in order, and should establish synchronization for each vehicle on the final vehicle assembly line. Thus, an exemplary embodiment of the present invention may generate and store a unique key different for each vehicle using a common shared key injected when the vehicle is manufactured.

The storage 112 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 113 may be electrically connected to the communication device 111, the storage 112, or the like and may electrically control the respective components. The processor 113 may be an electrical circuit which executes instructions of software and may perform a variety of data processing and determination described below.

The processor 113 may process a signal delivered between the respective components of the vehicle communication security device 110 and may perform the overall control such that the respective components may normally perform their own functions.

The processor 113 may be implemented in a form of hardware, may be implemented in a form of software, or may be implemented in a form of a combination thereof. The processor 113 may be implemented as a microprocessor and may be, for example, an electronic control unit (ECU), a micro controller unit (MCU), or another sub-controller, which is loaded into the vehicle.

The processor 113 may generate a unique key specialized in the vehicle by a key derivation function (KDF) based on the previously stored shared key and the VIN.

Furthermore, the processor 113 may encrypt data to be transmitted using the unique key and may decrypt the received data using the unique key.

Furthermore, when the vehicle communication security device 110 is a gateway or an engine control unit, the processor 113 may transmit the VIN to other controllers per predetermined period, when the ignition of vehicle is initially turned on.

Figure 4:
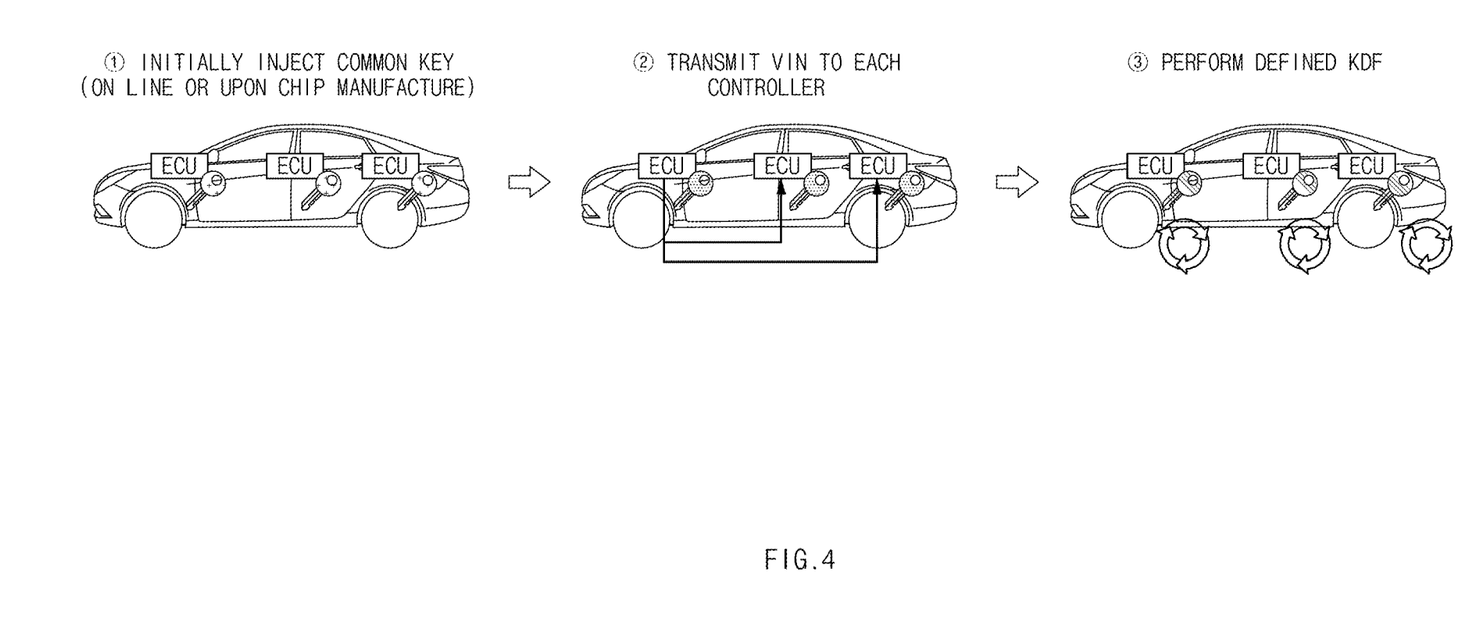
FIG. 4 is a drawing illustrating a process of generating a shared key for each vehicle according to various exemplary embodiments of the present invention.

FIG. 4 is a drawing illustrating a process of generating a shared key for each vehicle according to various exemplary embodiments of the present invention.

Referring to FIG. 4, it is assumed that n shared key sets are initially stored per controller. The shared key may be injected at the time of chip manufacture or on an original equipment manufacturing (OEM) final process line. When the shared key is written once in a time password (OTP) area, it is impossible to change or delete the shared key again. Furthermore, as the same shared key set is applied to all vehicle types and controllers, the shared key refers to an initial common OEM key. It is very easy to inject such a shared key on the process line, and there is no need to have a special key management system or perform a separate procedure.

After the final vehicle is assembled on the OEM process line while a common shared key set is injected into a plurality of controllers in the vehicle, when ignition of the vehicle is initially turned on, a gateway or an engine control unit transmits a VIN, included in a message to be used for a security application, to the controllers in the vehicle. In the instant case, there may be a message omission element due to CAN communication characteristics, and a corresponding message may be transmitted periodically until a certain time, because a wake-up time differs for each controller. A controller which initially receives a security application message applies a previously defined key derivation function (KDF) based on a VIN to generate a unique key for each vehicle. Accordingly, each of all vehicles generates an independent unique key shared between controllers using a unique VIN of the host vehicle. In the instant case, the unique key is maintained in a secure area such as HSM or HEE, irrespective of on/off of the ignition of the vehicle, when initially generated, to ensure confidentiality and integrity thereof without being deleted or changed. Thus, the unique key is generated once on the initial vehicle process line, which should be changed or deleted.

Thus, the vehicle system 100 according to various exemplary embodiments of the present invention may generate a unique key independent for each vehicle to run various security applications.

Figure 5:
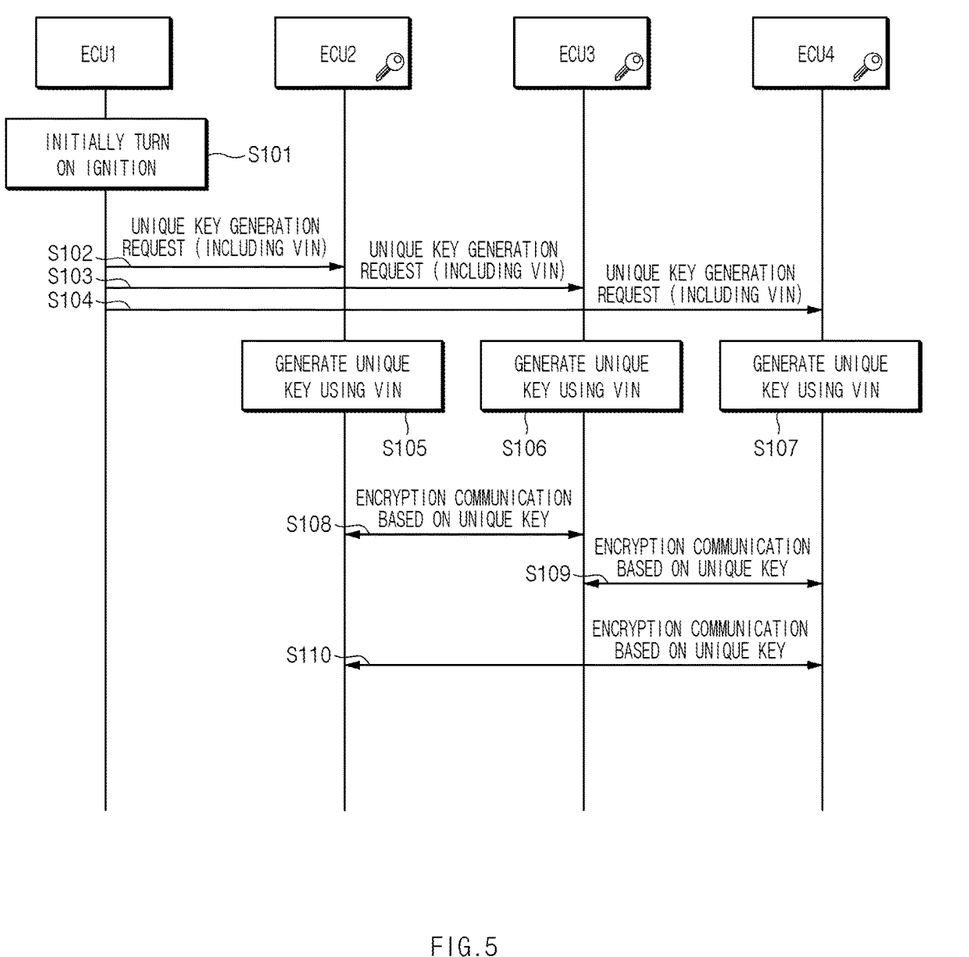
FIG. 5 is a signal sequence diagram illustrating a security communication method between controllers in a vehicle according to various exemplary embodiments of the present invention.

Hereinafter, a description will be provided in detail of a security communication method between controllers in a vehicle according to various exemplary embodiments of the present invention with reference to FIG. 5. FIG. 5 is a signal sequence diagram illustrating a security communication method between controllers in a vehicle according to various exemplary embodiments of the present invention.

Hereinafter, it is assumed that a vehicle system 100 of FIG. 1 performs a process of FIG. 5. Furthermore, in a description of FIG. 5, an operation referred to as being performed by each of controllers ECU1, ECU2, ECU3, and ECU4 may be understood as being controlled by a processor 113 of a vehicle communication security device 110 of each of the controllers ECU1, ECU2, ECU3, and ECU4.

Referring to FIG. 5, when the ignition is initially turned on in S101, in S102 to S104, the controller ECU1 may transmit a unique key generation request message to the other controllers ECU2, ECU3, and ECU4. In the instant case, the unique key generation request message may include a VIN.

Receiving the unique key generation request message, in S105 to S107, the controllers ECU2, ECU3, and ECU4 may respectively generate unique keys by a KDF using the VIN and the shared key.

Thus, in S108 to S110, the controllers ECU2, ECU3, and ECU4 may perform encryption communication using the unique keys which are respectively generated and stored.

Figure 6:
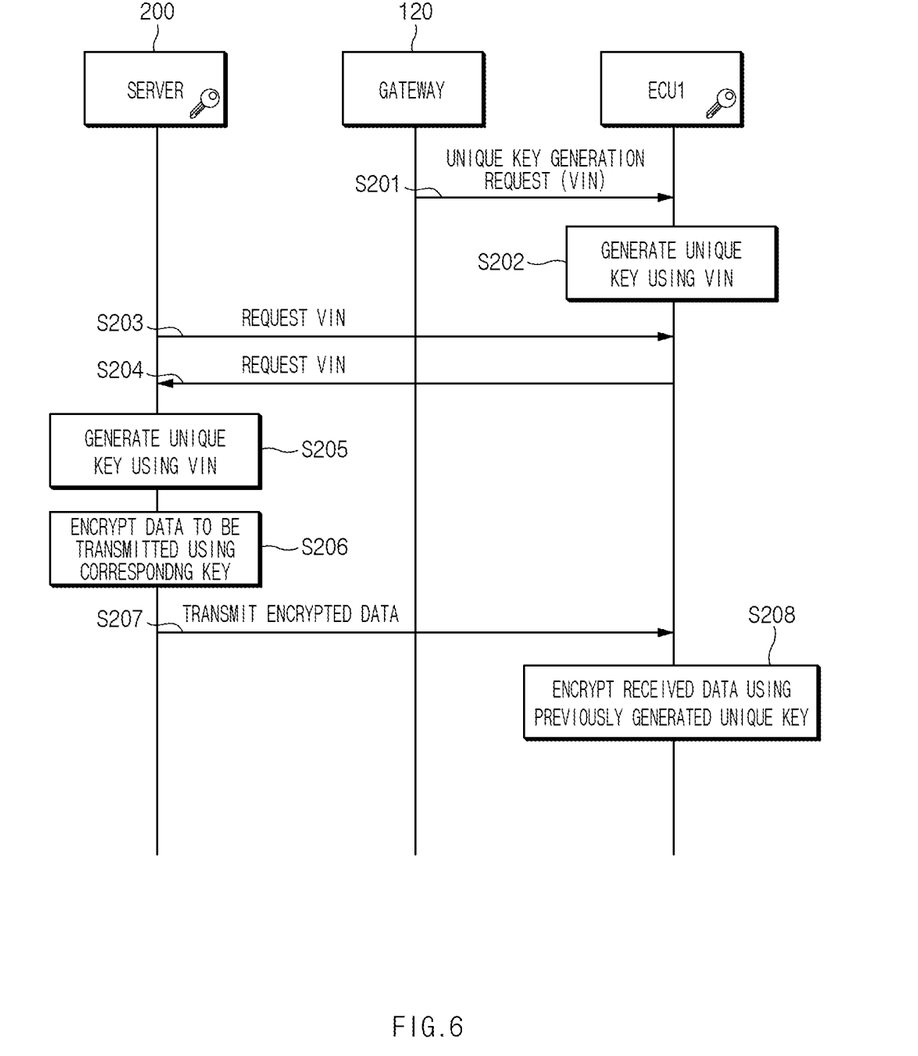
FIG. 6 is a signal sequence diagram illustrating a security communication method between a controller in a vehicle and a server according to various exemplary embodiments of the present invention.

Hereinafter, a description will be provided in detail of a security communication method between a controller in a vehicle and a server according to various exemplary embodiments of the present invention with reference to FIG. 6. FIG. 6 is a signal sequence diagram illustrating a security communication method between a controller in a vehicle and a server according to various exemplary embodiments of the present invention.

Hereinafter, it is assumed that a vehicle system 100 and a server 200 of FIG. 1 perform a process of FIG. 6. Furthermore, in a description of FIG. 6, an operation referred to as being performed by each of controllers ECU1, ECU2, ECU3, and ECU4 may be understood as being controlled by a processor 113 of a vehicle communication security device 110 of each of the controllers ECU1, ECU2, ECU3, and ECU4. In FIG. 6, a description will be provided of an example of encryption communication between the server 200 and the controller ECU1 of the vehicle system 100, and communication is performed through a separate gateway.

Referring to FIG. 6, when ignition of the vehicle is initially turned on, in S201, a gateway 120 may transmit a unique key generation request message including VIN to the controller ECU1. In S202, the controller ECU1 may generate and store a unique key by a KDF using the VIN.

Thereafter, in S203, the server 200 may request the controller ECU1 to transmit a VIN for communication with the vehicle system 100.

Thus, the controller ECU1 may transmit the VIN to the server 200 in S204. In S205, the server 200 may generate and store a unique key by a KDF using the VIN.

In S206, the server 200 may encrypt data to be transmitted using the generated unique key. In S207, the server 200 may transmit the encrypted data to the controller ECU1. In S208, the controller ECU1 may decrypt the received data using the unique key stored therein.

Accordingly, an exemplary embodiment of the present invention may generate a unique key shared for security communication between controllers in the vehicle, which may generate a unique key specialized for each vehicle using a vehicle identification number to generate and maintain a unique key independent for each vehicle, although a type of each vehicle is a same as each other such that it is possible to use the unique key securely for a long time.

Furthermore, an exemplary embodiment of the present invention may only inject a shared key once, when the vehicle is produced, without injecting a specific key on the process by a complicated key management system, and may generate a unique key independent for each vehicle, when the ignition of the vehicle is turned on.

Furthermore, an exemplary embodiment of the present invention may perform key synchronization for each controller to store the key in a secure storage upon only the vehicle production process, may not need to generate a key, whenever the ignition of the vehicle is turned on or off, and may not need to consider a wake-up time of each of all controllers which share the key.

Furthermore, an exemplary embodiment of the present invention may perform communication between controllers in the vehicle and communication between the vehicle and the server using a unique key different for each vehicle such that a replay attack or a key collision using data obtained from one vehicle is almost impossible.

Figure 7:
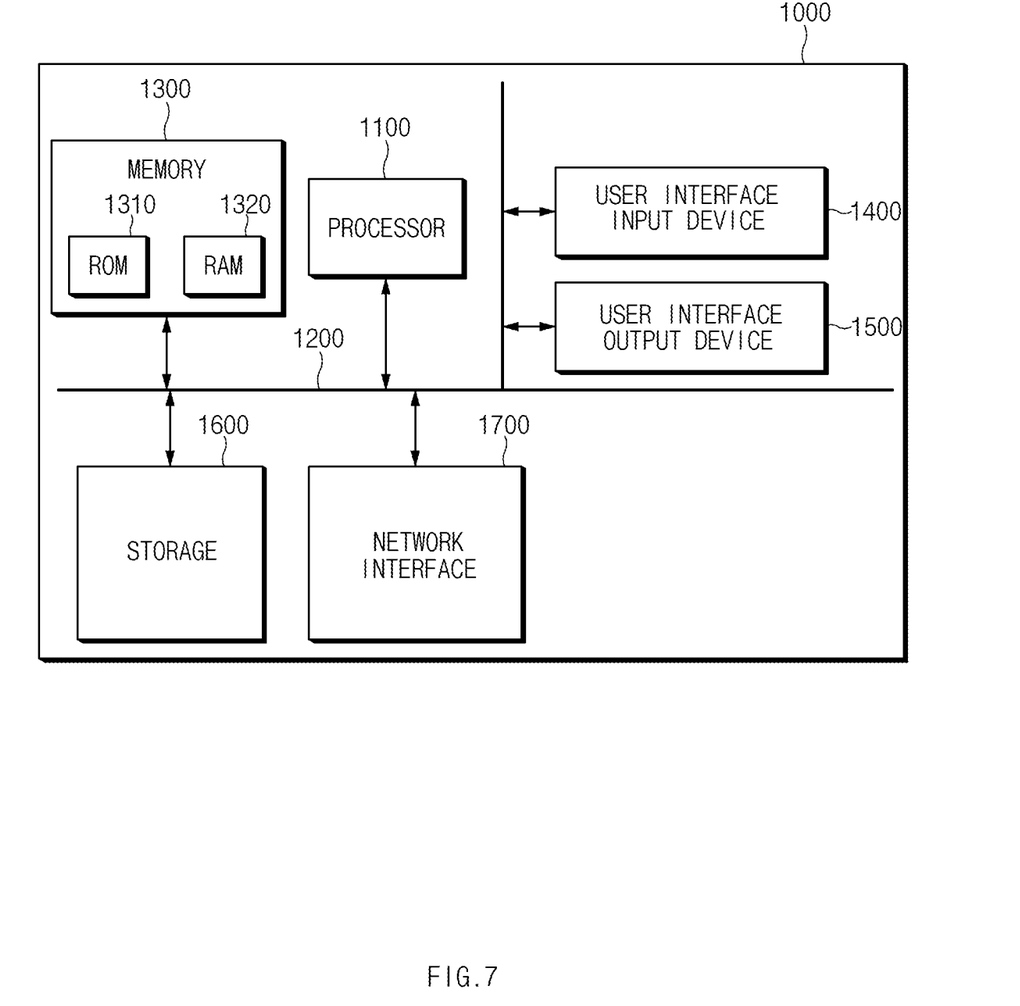
FIG. 7 is a block diagram illustrating a determining system according to various exemplary embodiments of the present invention.

FIG. 7 is a block diagram illustrating a computing system according to various exemplary embodiments of the present invention.

Referring to FIG. 7, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may generate a unique key in the vehicle, which differs for each vehicle, using a vehicle identification number to perform vehicle communication security.

Furthermore, various effects ascertained directly or indirectly through the present invention may be provided.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle system comprising:
    a first controller in a vehicle configured to transmit vehicle identification information to other controllers in the vehicle; and
    a second controller and a third controller among the other controllers, wherein each of the second controller and the third controller is configured to generate and store a unique key of the vehicle using the vehicle identification information received from the first controller and a previously stored shared key,
    wherein the second controller and the third controller perform communication according to the unique key generated by each controller each of the second controller and the third controller, the first controller is configured to transmit a unique key generation request message including the vehicle identification information to the second controller and the third controller, when ignition of the vehicle is initially turned on, wherein the second controller or the third controller is configured to generate the unique key shared in the vehicle by a key derivation function (KDF).

2. The vehicle system of claim 1, wherein the second controller is configured to encrypt communication data using the unique key and to transmit the encrypted communication data to the first controller or the third controller.

3. The vehicle system of claim 2, wherein the second controller is configured to decrypt encrypted communication data received from the first controller, using the unique key stored in the second controller.

4. The vehicle system of claim 1, wherein the first controller includes a gateway or an engine controller.

5. The vehicle system of claim 1, wherein the first controller is configured to transmit the vehicle identification information to the other controllers per a predetermined time period.

6. The vehicle system of claim 1, wherein a same unique key is stored in the second controller and the third controller.

7. The vehicle system of claim 1, wherein the unique key varies for each vehicle, although a type of each vehicle is a same as each other.

8. The vehicle system of claim 1, wherein the first controller includes:
    a communication device configured to communicate with the other controllers;
    a storage storing the shared key; and
    a processor configured to generate the unique key using the vehicle identification information and the shared key, when ignition of the vehicle is initially turned on.

9. The vehicle system of claim 8, wherein the storage includes a hardware security module (HSM) or a trust execution environment (TEE).

10. A server configured for:
    communicating with a vehicle system including a first controller in a vehicle which is configured to transmit vehicle identification information to other controllers in the vehicle and each of a second controller and a third controller among the other controllers which is configured to generate and store a first unique key of the vehicle using the vehicle identification information received from the first controller and a previously stored shared key;
    requesting the first controller to transmit the vehicle identification information; and
    receiving the vehicle identification information from the first controller, generating and storing a second unique key using the previously stored shared key and the vehicle identification information, and communicating with the vehicle system using the second unique key,
    wherein the second controller and the third controller perform communication according to the first unique key generated by each controller each of the second controller and the third controller, the first controller is configured to transmit a unique key generation request message including the vehicle identification information to the second controller and the third controller, when ignition of the vehicle is initially turned on, wherein the server is further configured for:
    encrypting communication data using the second unique key and transmitting the encrypted communication data to the vehicle system; and
    decrypting encrypted communication data received from the vehicle system using the second unique key.

11. The server of claim 10, wherein the first unique key and the second unique key are a same as each other.

12. A vehicle communication security method including:
    transmitting, by a first controller in a vehicle, vehicle identification information to a second controller and a third controller in the vehicle;
    transmitting, by the first controller, a unique key generation request message including the vehicle identification information to the second controller and the third controller, when ignition of the vehicle is initially turned on;
    generating and storing, by each of the second controller and the third controller, a unique key of the vehicle using the vehicle identification information received from the first controller and a previously stored shared key, wherein the generating and storing of the unique key includes:
generating the unique key shared in the vehicle by a key derivation function (KDF); and
    performing communication according to the unique key between the second controller and the third controller, wherein the second controller and the third controller perform communication according to the unique key generated by each controller each of the second controller and the third controller.

13. The vehicle communication security method of claim 12, wherein the transmitting includes:
   transmitting, by the first controller, the vehicle identification information to the second controller and the third controller per a predetermined time period.

14. The vehicle communication security method of claim 12, further including:
   transmitting, by the first controller, the vehicle identification information to a server, when receiving a request for the vehicle identification information from the server.

15. The vehicle communication security method of claim 14, further including:
   decrypting, by the first controller, encrypted data according to the unique key, when receiving the encrypted data from the server.

* * * * *